United States Patent [19]
Ghaem-Maghami et al.
[11] 3,814,842
[45] June 4, 1974

[54] RGB AMPLIFIER

[75] Inventors: Sanjar Ghaem-Maghami, Chesapeake, Va.; Edward P. Surowiec, Clinton, N.Y.

[73] Assignee: General Electric Company, Portsmouth, Va.

[22] Filed: Apr. 9, 1973

[21] Appl. No.: 349,610

[52] U.S. Cl. .......... 178/5.4 MA
[51] Int. Cl. .......... H04n 9/52
[58] Field of Search .......... 178/5.4 R, 5.4 MA

[56] References Cited
UNITED STATES PATENTS

| | | | |
|---|---|---|---|
| 2,927,957 | 3/1960 | Torre | 178/5.4 MA |
| 3,701,843 | 10/1972 | Hepner et al. | 178/5.4 MA |

*Primary Examiner*—Richard Murray

[57] ABSTRACT

A passive matrixing network is provided for combining the color difference signals with the luminance signal. The network feeds into a high input impedance amplifier which enables large value resistors to be used in the matrix to prevent cross coupling of the color difference signals. AC coupling from the matrix and DC level restoration avoids DC interface problems between the luminance and color difference circuitry and the chrominance amplifier. The combination of positive and negative power supplies for the amplifier and the isolation provided by the high input impedance permits low level simplified brightness control circuitry to establish the DC restoration circuitry. In addition, the driver input stage of the chrominance amplifier is switchable to provide isolation to the DC restoration circuit during blanking and to provide a short time constant for this circuit to obtain full realization of the DC level with in the alloted time period. Also the power output stage is both very stable and provides protection from cathode ray tube arcing.

14 Claims, 2 Drawing Figures

RGB AMPLIFIER

BACKGROUND OF THE INVENTION

In color television receivers, the ordinary practice is that incoming signal information is demodulated into a luminance signal (Y), and a color difference signal for each primary color (R-Y), (B-Y), (G-Y). The luminance signal is then added to each color difference signal and the resultant color signals are amplified and then applied to respective grids of a color picture tube. Most commonly, the addition is performed by applying each color difference signal to the base of a transistor and by applying the luminance signal to the emitter. The resultant color signal taken from the collector of the transistor represents the algebraic sum of the two signals. However, the resultant color signal will also contain intermodulation products of the two applied signals due to the non-linear characteristics of the base-emitter diode in the transistor. In addition, with the collector of the transistor connected to a color picture tube, arcing in the tube will cause reverse biasing of the base-collector diode which results in a large destructive current traveling back through the base to expansive I-C circuitry which develops the color difference signals.

Occasionally, the luminance and color difference signals have been added together in passive networks to avoid the intermodulation products. However, such circuits have presented difficulties. First, it has been difficult to maintain isolation between the various color difference channels through the common luminance channel. Secondly, where it is desired to place the matrix circuitry on a different circuit board from the luminance and color difference boards and to provide for replaceability of these boards, it has proven difficult to compensate for the DC voltage interface problems between different boards.

Additionally where prior art circuits have employed passive matrix circuits to obtain RGB color signals, the high gain amplifiers employed have been sensitive to gain variations which again is more aggravating when interchangeability of boards for easier servicing is the object desired.

It is therefore an object of the present invention to provide a stable amplifier circuit permitting matrixing of luminance and color difference signals in a linear passive matrix to obtain color signals in which isolation between the color difference channels is maintained.

It is another object to provide for circuit board interchangeability of the chroma processing board by avoiding DC voltage interface problems.

A further object is to provide a stable amplifier having minimum dependence on transistor parameter variations.

These and other objects are realized in the present invention wherein a passive matrix is employed to linearly add the luminance signal with the color difference signals to obtain RGB chrominance information. This information is AC coupled to a high input impedance amplifier the DC operating level of which is restored to a desired level so that compensation for variations in the DC level of the color difference signals and the luminance signal is avoided. An emitter follower input transistor receives each color signal and drives a grounded base output transistor. The stable output configuration is obtainable through provision of positive and negative supply voltages for this amplifier. The combination of the positive and negative voltage supplies and the high input impedance driving transistor enables employment of a low level diode clamped supply for the brightness control and DC restoration circuit at the input of the amplifier. In addition, to prevent loading of the DC restoration circuit the input transistor of the amplifier switches off to eliminate drain during the charging period.

BRIEF DESCRIPTION OF THE DRAWINGS

Further objects and features of the invention and those objects and features set forth above will be more readily understood from the following detailed description, taken in conjunction with the drawings, in which.

DESCRIPTION OF THE INVENTION

Figure 1:
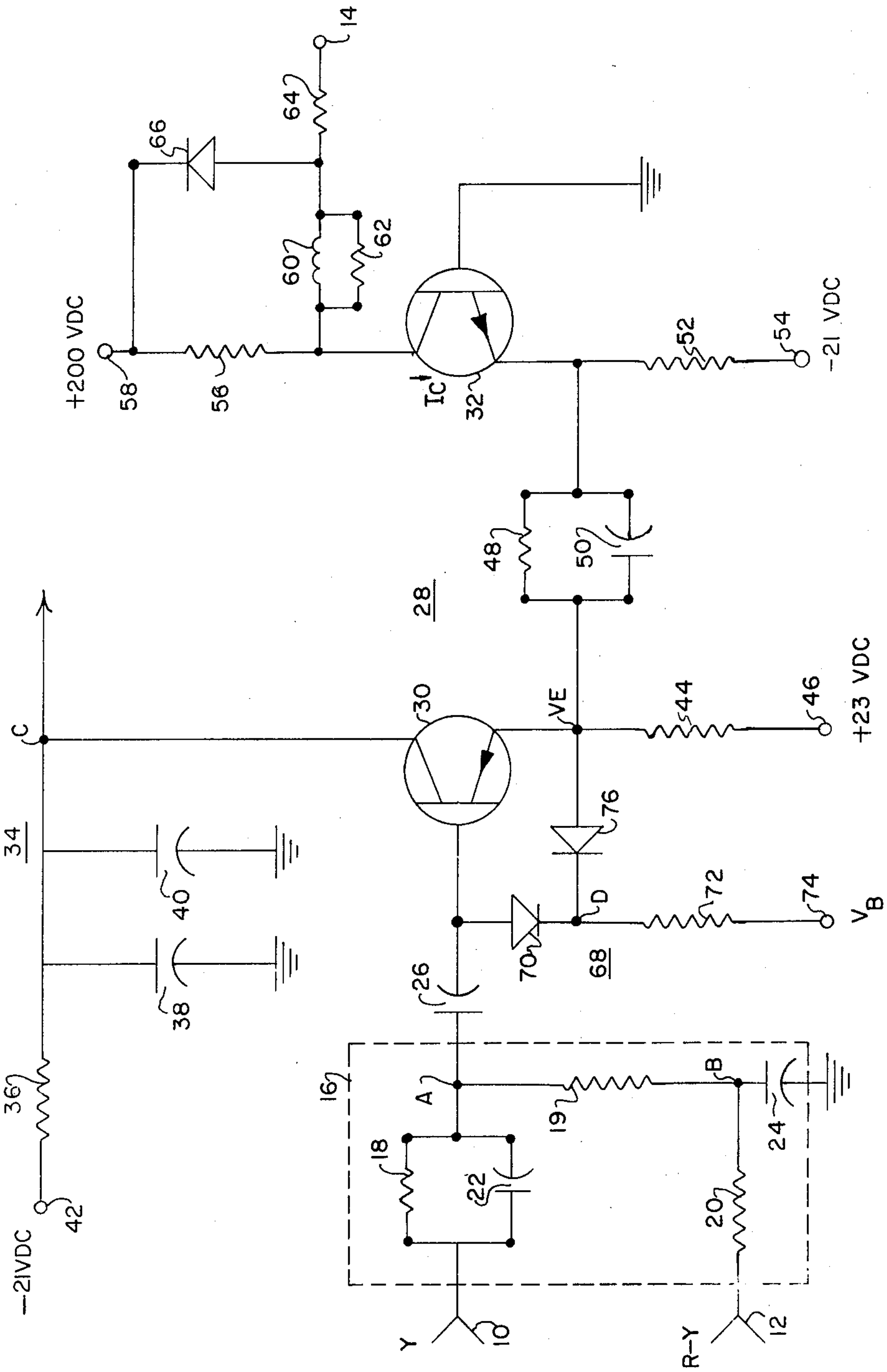
FIG. 1 is a schematic drawing of a preferred embodiment of the RGB processing circuit of the present invention.

In most of today's color television receivers, circuitry is provided to derive from an incoming color signal a luminance signal (Y) and three color difference signals (R-Y) (B-Y), and (G-Y). The circuitry shown in FIG. 1 is used to combine a luminance signal (Y) applied at terminal 10 with a red color difference signal (R-Y) applied at terminal 12 and generate at terminal 14 an amplified red color signal (R) to be applied to the red cathode of a large screen color television tube. Two circuits in addition to that shown in FIG. 1 are to be used to generate blue (B) and greed (G) color signals for the blue and green cathodes from the linear combination of the luminance signal (Y) with the blue and green color difference signals (B-Y) and (G-B). Since the structure and operation of all three circuits are the same, only the circuitry for the red color signal is shown and described in detail herein. Also, the circuitry used to generate the luminance signal (Y) and the circuitry used to generate the color difference signals (R-Y), (B-Y), and (G-Y) may be of any known design and, therefore, are not shown.

In FIG. 1, a passive network 16 is shown which provides at point A a red color signal equal to the algebraic sum of a luminance signal (Y) applied at input 10 and a red color difference signal (R-Y) applied at input 12. Passive network 16 comprises resistors 18, 19 and 20 and capacitors 22 and 24. Resistor 18 is connected in parallel with capacitor 22 between input 10 and one end of resistor 19 at point A. Resistor 20 is connected between input 12 and the other end of resistor 19 at point B. Point B is connected to ground by capacitor 24.

The red color signal appearing at point A is AC coupled by capacitor 26 to the input of a high input impedance amplifier 28 comprising transistors 30 and 32. In particular, capacitor 26 connects point A to the base of transistor 30. This transistor is connected as an emitter follower to provide high input impedance and low output impedance. The collector of transistor 30 is connected to a common DC coupling network 34 comprising resistor 36 and capacitors 38 and 40. Resistor 36 is connected between a negative 21 VDC source at terminal 42 and the collector of transistor 30 at point C.

Point C is AC coupled to ground by the parallel combination of capacitors 38 and 40. It is to be understood that the common decoupling network 34 provides a common collector source at point C for transistors similar to transistor 30 in the blue and green circuitry not shown.

The emitter of transistor 30 is connected by resistor 44 to a positive 23 VDC source at terminal 46. The emitter of transistor 30 is also connected to the emitter of transistor 32 by the parallel combination of resistor 48 and capacitor 50. These latter two elements have values selected to provide high frequency peaking of the color signal.

The emitter of transistor 32 is connected by resistor 52 to a negative 21 VDC power supply at terminal 54. The base of transistor 32 is connected directly to ground and the collector of transistor 32 is connected by load resistor 56 to a positive 200 VDC power supply at terminal 58. The collector of transistor 32 is also connected to supply the red color signal for a cathode of a large screen color picture tube at terminal 14 through a circuit which includes a resistor 64 in series with a parallel circuit comprising inductive choke 60 and resistor 62. A diode 66 is connected between resistors 62 and 64 and terminal 58 to protect transistor 32 in the event of arcing in the picture tube.

FIG. 1 further shows a DC restoration circuit 68 connected between capacitor 26 and the high input impedance amplifier 28, and specifically to the base of transistor 30. The d-c restoration circuit comprises the series combination of diode 70 and resistor 72 connected between the base of transistor 30 and a terminal 74. A brightness control voltage $V_B$ is supplied from a controlled voltage source at terminal 74 so as to provide adjustment of the DC level to which capacitor 26 is changed. A diode 76 is connected between the emitter of transistor 30 and the junction point (D) of diode 70 resistor 72. Diode 76 is chosen to have the same temperature coefficient as the base-emitter diode of transistor 32.

Figure 2:
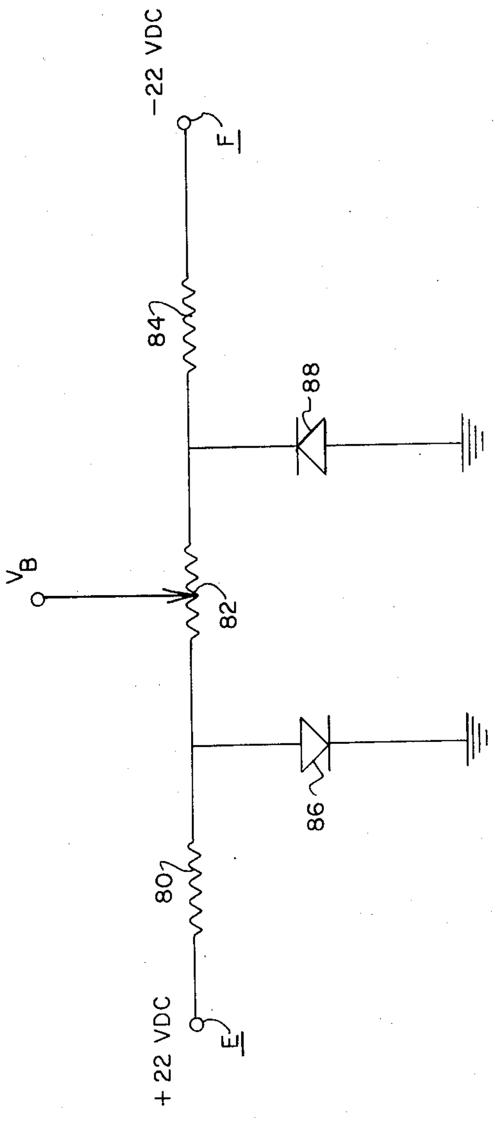
FIG. 2 is a schematic drawing of a preferred embodiment of the brightness control used with the RGB processing circuit of FIG. 1.

FIG. 2 shows a preferred circuit for providing brightness control Voltage $V_B$ at terminal 74. The circuitry comprises resistors 80, 82, and 84 connected in series between a positive 22 VDC source at terminal E and a negative 22 VDC source at terminal F. Diode 86 is connected between one end of resistor 82 and ground and diode 88 is connected between the other end of resistor 82 and ground. A variable tap is taken from resistor 82 to supply brightness control voltage $V_B$ In operation, a luminance signal (Y) is applied to terminal 10 and a red color difference signal (R-Y) is applied to terminal 12. A linear combination of the signals is produced by passive matrixing network 16 at point A. Resistors 18, 19 and 20 and capacitors 22 and 24 of passive network 16 in addition to providing for this linear combination of signals are chosen to provide high frequency peaking for the luminance signal and 3.58 mhz attenuation of the color difference signal to avoid passing burst pulse information. Even though the frequency response for the color difference signal is 15 (db) down at 3.58 mhz, a suitable bandwidth is provided to assure good chroma transients. One set of values for the components of passive network 16 which produce the above results is:

| | |
|---|---|
| resistor 18 | 1.5k ohms |

-Continued

| | |
|---|---|
| resistor 19 | 1. k ohms |
| resistor 20 | 1.5k ohms |
| capacitor 22 | 220 pf |
| capacitor 24 | 220 pf |

These high impedance resistors can be employed due to the relatively greater input impedance of the amplifier 28 afforded by the emitter follower configuration of transistor 30. Such high impedance resistors provides isolation between the color difference channels so that distortion is not introduced through the common tie point A of the three color difference signals. Another advantage of the circuit of FIG. 1 over prior art circuits is that the luminance and color difference signals may be AC coupled to terminals 10 and 12 to eliminate DC drift and offset variations of either or both the preceding luminance and chroma circuits.

The undistorted red color signal appearing at point A of passive network 16 is AC coupled to the high input impedance amplifier 28 which amplifies the red color signal to a high enough level to drive the red cathode of a large screen color picture tube at terminal 14. In amplifier 28, transistor 30 is used to provide a high input impedance and a low output impedance which is suitable for driving transistor 32.

By the use of a negative supply at terminal 54 and a positive supply at terminal 58, the base of transistor 32 can be tied directly to ground. This results in several operational advantages over prior art devices. One advantage is that by tying the base of transistor 32 to ground, the DC operating point for transistor 32 is stabilized since the output voltage at terminal 14 is directly proportional to the collector current $I_c$ in transistor 32, and with the base resistance of transistor 32 nearly zero (i.e. tied to ground) the effects of transistor beta variations with temperature and from one transistor to another have been minimized. By thus stabilizing the DC operating point, grey scale shift, a constant problem in prior art color television circuits, is reduced to a minimum.

Another advantage of amplifier 28 is that since the base of transistor 32 is tied to ground, any ineffectiveness of diode 66 to respond to end drain off high current surges is compensated for by the attenuate path to ground through the collector-base diode. This eliminates unnecessary destruction of the preceeding I-C chroma circuitry.

It is recognized that the desirable advantages of grounding the base of transistor 32 comes at the price of difficult driving requirements. This is due to the fact that the grounded base cnfiguration presents a very low impedance to the driving transistor 30. This problem is solved by the yet lower output impedance of this emitter follower driver.

Another advantage obtained from the grounded base configuration and the high input impedance of transistor 30 is the extremely simple low level brightness control circuit of FIG. 2. This circuit may operate about the zero volts level due to the control terminal of the output stage of the amplifier being referenced to zero volts. This feature permits ordinary inexpensive diodes 86 and 88 to be utilized to clamp the ends of potentiometer 82 about the zero volts mid-range operating point. This brightness control circuit is at once both a stiff voltage source unaffected by variation in the supply voltages at E and F due to the diode clamping and a low impedance, i.e. short time-constant, charging path for the DC restoration capacitor 26.

The high input impedance of transistor 30 provides an ideal point at the base of this transistor to restore the DC level of the AC coupled red color signal.

The red color signal appearing at point A comprises negative going red video information in combination with periodic positive going sync pulses. Transistor 30 may be biased by employment of diodes 70 and 76 so that it will turn off when a positive going sync pulse is applied to capacitor 26. When the voltage at the base of transistor 30 exceeds a threshold value equal to the emitter voltage $V_E$ minus the base-emitter drop, diodes 70 and 76 will then clamp the base to a voltage substantially equal to the emitter voltage $V_E$, although controllable by adjustment of the voltage $V_B$. Transistor 30 can not resume conduction until the positive going horizontal sync pulse has passed and the red color signal returns below the threshold value. Thereafter the emitter voltage of transistor 30 will vary in accordance with the value of the applied red color signal about the selected average DC brightness level.

The voltage $V_E$ is determined predominantly by the value of resistors 44 and 52 and 72 and is of such value as to lower the operating level of transistor 32 to provide blanking of the cathode ray tube during retrace portions of the raster. When transistor 30 again conducts with the passing of the sync pulse, the voltage $V_E$ is lowered to the level of the charge on capacitor 26 which is the average value of the chrominance signal and the brightness control setting.

It should be recognized that the added advantage obtained by the switchable performance of transistor 30 to be OFF during blanking provides even greater isolation for the DC restoration circuit during its charge cycle.

One set of values for the components of amplifier 28 and DC restoration circuit 68 which produces the above results are:

| | |
|---|---|
| resistor 36 | 360 ohms |
| resistor 44 | 3.3k ohms |
| resistor 48 | 60 ohms |
| resistor 52 | 6.2k ohms |
| resistor 56 | 7.7k ohms |
| resistor 62 | 15k ohms |
| resistor 64 | 1k ohms |
| capacitor 38 | 100mf |
| capacitor 40 | 0.1mf |
| capacitor 26 | 10mf |
| capacitor 50 | 0.0047mf |
| choke 60 | 390uh |
| transistor 30 | GE type D29A |
| transistor 32 | GE type D40N3 |

The disclosed circuitry, therefore, describes a passive network for adding a luminance signal to a color difference signal to produce an undistorted resultant color signal; a highly stable amplifier for amplifying the resultant color signal needed to run a cathode of a large screen color picture tube, and a simple economic circuit for inserting a controlled d-c level to the color signal.

Various changes may be made in the disclosed preferred embodiment of the invention without departing from the spirit of the invention. For example, one variation would be to apply a blanking signal to the brightness control circuit rather than by means of the video sync pulse. In this case turn OFF of the input transistor 30 would not result. It is therefore to be understood that the invention is not to be limited by the single embodiment disclosed or by the specific details and values shown and described, but only as defined in the appended claims.

What is claimed and desired to be secured by letters Patent of the United States is:

1. In a color television receiver a chrominance processing circuit comprising:

a matrix circuit responsive to the luminance signal and color difference signals developed in said receiver to linearly combine said luminance signal with each color difference signal to obtain chrominance signals, amplifier means responsive to each of said chrominance signals to amplify and apply said chrominance signals to input electrodes of the cathode ray tube of said television receiver, each amplifier means including a first high input impedance stage and a second low input impedance stage, means for AC coupling said chrominance signals to said amplifier means, and means coupled to each first stage of said amplifier means to establish the brightness level of said chrominance signals, the input impedance of said amplifier means being sufficiently high to permit said matrix circuit to comprise high impedance passive networks to provide isolation between said color difference signals.

2. A chrominance processing circuit as recited in claim 1 wherein the impedance of the passive networks of said matrix circuit is high relative to the output impedance of the source of said luminance signal and the input impedance of said amplifier means is high relative to the impedance of said passive networks.

3. In a television receiver a chrominance processing circuit comprising:

a matrix circuit responsive to the luminance signal and color difference signals developed in said receiver to linearly combine said luminance signal with each color difference signal to obtain chrominance signals, amplifier means responsive to each of said chrominance signals to amplify and apply said chrominance signals to input electrodes of the cathode ray tube of said television receiver, each amplifier means including a first high input impedance stage and a second low input impedance stage, means for AC coupling said chrominance signals to said amplifier means, and control means cntrolling the DC operating level of said amplifier means, the second stage of each of said amplifier means including semiconductor means having the control terminal thereof referenced to zero DC volts to minimize the effects the intrinsic parameter variations of said semiconductor means have at the output of said amplifier means.

4. A chrominance processing circuit as recited in claim 3 wherein said semiconductor means is a grounded base transistor providing a path to ground for cathode ray tube arc currents to protect said amplifier means and preceding circuitry.

5. A chrominance processing circuit as recited in claim 3 wherein said control means is adjustable about a point of zero DC volts and provides a low impedance charging path to charge said AC coupling means to establish the DC operating level of said amplifier means.

6. A chrominance processing circuit as recited in claim 5 wherein said control means includes diode clamping means establishing a fixed voltage range for said control means.

7. A chrominance processing circuit as recited in claim 5 wherein each first stage of said amplifier means includes means to bias said first stage to a state of non conduction during the period said DC operating level is established.

8. In a television receiver a chrominance processing circuit comprising:

a matrix circuit responsive to the luminance signal and color difference signals developed in said receiver to linearly combine said luminance signal with each color difference signal to obtain chrominance signals, amplifier means responsive to each of said chrominance signals to amplify and apply said chrominance signals to input electrodes of the cathode ray tube of said television receiver, each amplifier means including an emitter follower transistor input stage and a grounded base transistor output stage, capacitor means for AC coupling said chrominance signals to said amplifier means, and means coupled to the input stage of each amplifier means to restore the DC level of said chrominance signals.

9. A chrominance processing circuit as recited in claim 8 wherein said means to restore the DC level comprises an adjustable low impedance voltage source to charge said capacitor means to said DC level.

10. A chrominance processing circuit as recited in claim 9 wherein said low impedance voltage source includes diode clamping means to fix the range of said source.

11. A chrominance processing circuit as recited in claim 10 wherein said low impedance voltage source includes a positive voltage supply, a negative voltage supply, potentiometer means coupled between said positive and negative supplies and said diode clamping means clamping said potentiometer to ground to establish the fixed low voltage range for said potentiometer which is free from variations in said voltage supplies.

12 A chrominance processing circuit as recited in claim 8 wherein said matrix circuit is comprised of passive elements having an impedance that is sufficiently high to minimize interference between said color difference signals.

13. A chrominance processing circuit as recited in claim 8 wherein the emitter follower transistor and grounded base transistor of each amplifier means is energized by positive and negative voltage supplies.

14. A chrominance processing circuit as recited in claim 9 wherein the input stage of each amplifier includes means to bias said emitter follower transistor OFF during the period of charging said capacitor means.

* * * * *